(12) United States Patent
Fujimori et al.

(10) Patent No.: US 7,070,647 B2
(45) Date of Patent: Jul. 4, 2006

(54) CEMENT COMPOSITION

(75) Inventors: Shinsaku Fujimori, Ibaraki (JP); Shigeji Kobori, Saitama (JP)

(73) Assignee: National Institute for Rural Engineering, Tsukuba (JP)

( * ) Notice: Subject to any disclaimer, the term of this patent is extended or adjusted under 35 U.S.C. 154(b) by 921 days.

(21) Appl. No.: 09/786,967

(22) PCT Filed: Feb. 21, 2001

(86) PCT No.: PCT/JP01/01259

§ 371 (c)(1),
(2), (4) Date: Apr. 23, 2001

(87) PCT Pub. No.: WO02/064527

PCT Pub. Date: Aug. 22, 2002

(65) Prior Publication Data

US 2005/0016421 A1    Jan. 27, 2005

(30) Foreign Application Priority Data

Feb. 14, 2001 (JP) .............................. 2001-036285

(51) Int. Cl.
*C04B 9/00* (2006.01)
*C04B 12/02* (2006.01)

(52) U.S. Cl. ...................... 106/691; 106/692; 106/694; 106/695; 106/773; 106/774; 106/775; 106/776; 106/778; 106/788

(58) Field of Classification Search ................ 106/691, 106/692, 694, 695, 773, 774, 775, 776, 778, 106/788

See application file for complete search history.

(56) References Cited

U.S. PATENT DOCUMENTS

| 4,487,632 A | 12/1984 | Sherif et al. |
| 4,505,752 A | 3/1985 | Sherif et al. |
| 5,718,757 A | 2/1998 | Guillou et al. |
| 2003/0041785 A1* | 3/2003 | Harrison ..................... 106/801 |

FOREIGN PATENT DOCUMENTS

| JP | 62-91582 A | * | 4/1987 |
| JP | 63-256557 | | 10/1988 |
| JP | 63-256557 A | * | 10/1988 |
| JP | 2002-167582 | * | 6/2002 |

* cited by examiner

Primary Examiner—Anthony J. Green
(74) Attorney, Agent, or Firm—Flynn, Thiel, Boutell & Tanis, P.C.

(57) ABSTRACT

A novel cement is alkalescent, capable of solidifying a wide range of soil and applicable to biological environment. The cement composition contains 100 parts by weight of magnesium oxide, 5 to 25% by weight of at least one of silicic acid, alumina and iron oxide, 3 to 35 parts by weight of a phosphate, 2 to 30 parts by weight of gypsum and 0.005 to 7 parts by weight of a hydroxycarboxylic acid or a ketocarboxylic acid.

3 Claims, No Drawings

CEMENT COMPOSITION

TECHNICAL FIELD TO WHICH THE INVENTION BELONGS

The present invention relates to a cement composition which improves the drawbacks of Portland cement wherein an environmental countermeasure is taken such that the cement composition has a low pH and is free from eluting a hexavalent chromium (hereinafter the cement composition is also referred to as a soil stabilizer in the specification).

PRIOR ART

It is a present state that Portland cement elutes a great quantity of hexavalent chromium such that it elutes 50 ppm of hexavalent chromium against the requirement of 1.5 ppm or less by Environment Agency Notification No. 46. Moreover, it elutes a high alkali material of pH 14 over a long period of time so that it is considered to effect environmental deterioration and scenery disruption. Further, since a scarcity of concrete aggregates has recently occurred, a concrete mold which does not use gravel and sand has been required. On the other hand, since a countermeasure against sludge which deposits on beds of river, pond and lake has not progressed in an easy way, a water environment affected by sludge deposition has become a large social problem.

To cope with these problems, environmental countermeasures such as cement in which a countermeasure against hexavalent chromium is taken, neutral cement, a neutral soil stabilizer, a high polymeric coagulant, an ultra water-absorbing resin and the like have been used. However, it is a present situation that a satisfactory result has not been obtained. As a neutral cement, magnesia phosphoric acid cement has conventionally been put on the market. However, it is high in cost and limited to a partial application so that it has been used as an adhesive rather than as a cement. The reason is based on that the chemical composition thereof is that of bobierrite and has a ratio of phosphoric acid to magnesium oxide of from 1:1 to 2:3 (mol), whereupon the adjustment of the setting time is difficult so that there are many products which show an exceedingly rapid setting compared with the pot life of Portland cement.

In a soil cement using a high-sulfate based stabilizer or a lime based soil stabilizer, a solidified product exhibits an extremely inferior strength generation in some cases in accordance with the qualities of the soil, whereupon they cannot comply with peat, andosols, acidic volcanic ashes in some cases. Particularly, in high organic sludge treatment, an agent with advantageous solidification which can reuse the sludge has been requested. Further, aggregates for use in concrete has been scarce for a long time and a novel cement which can solidify clay, silt, decomposed granitic soil, volcanic ashes and the like for utilizing them as an aggregate in cement is desired.

It is preferable that heavy metals and cyan specified by Environment Agency Notification No. 46, organic chlorides and the like do not elute in a pH range of 5.5 to 8.5 as environmental standards, whereas, as in Portland cement, in the case of a high pH or on the acidic side, if any one of lead and cadmium is stabilized, the other one tends to be eluted. Where a neutral stabilization is required, however, there exists no suitable solidifying material/stabilizer capable of corresponding to this kind of requirement. While, if in a pH range of 3.5 to 10.0, an effect of a chelating agent can be expected so that the stabilizer, which works in an alkalescent range, can be attained as an object. Further, various tests verify that, if a stabilizer which can decrease the moisture content of sludge from about 500% to 60% can be utilized, the sludge in beds of lakes can be treated in an easy manner. However, a pH range is required in which the sedimentation sludge in the beds of lakes is solidified without separating water therefrom and the resultant solidified product made of sludge can be utilized as a fertilizer. Concrete using Portland cement does not attract animate things in water thereon for a long period of time so it is required in the construction of blocks for use in revetment of rivers, tetrapod-like concrete blocks, artificial fishing banks and the like using materials other than conventional concrete and, for this purpose, there are some cases in which a folding trap for fish and the like has been used to replace them. Further, since banks of canals or rivers are protected from destruction by cutting weeds twice or more a year, it is required to decrease the number of weed cuttings by suppressing the growth of the weeds. Still furthermore, in agricultural engineering, in order to protect ridges between rice fields, farm roads and waterways from weeds and water leakage, they have been treated with soil cement and the like. However, due to pH problems and the inferior capability of soil solidification, the number of treatments of this kind has recently been decreased. As an engineering method for stabilizing soil, a soil solidification for bases for engineering and building has been performed by soil stabilization by means of deep layer mixing or surface layer solidification. However, it is pointed out that, in the case of a soil stabilizer, there exist problems related to pH and hexavalent chromium and, in the case of lime-based stabilizers, there exist problems related to pH and risks of underground water pollution. Even if the above-described problems are intended to be solved, there exist many problems which conventional soil stabilizers or lime-based stabilizers can not solve. In order to solve the above-described problems, provision of a novel cement which, being alkalescent, is capable of solidifying/stabilizing a wide range of soil and applicable to biological environment, has been required.

DISCLOSURE OF THE INVENTION

The present inventors found that a light burned magnesia, among magnesium oxides, reacts well with various types of phosphates, in particular, phosphate fertilizers within a specified ratio therebetween, while having a moderate setting time in the presence of gypsum and hydroxycarboxylic acid or a ketocarboxylic acid for the purpose of a reaction control and the resultant product shows a strength comparable to that of Portland cement and, further, a solid solution having the same chemical composition also reacts with a phosphate in a similar manner whereupon the present invention has been accomplished. That is, in a method of using a light burned magnesia and a phosphate in a non-chemical equivalent manner instead of using phosphate magnesia cement in a conventional chemical equivalent manner, it is one of the characteristics that the weight ratio of a light burned magnesia and a phosphate is in the range of 100:3 to 3.5. This is the same with a case where a main component of a solid solution is magnesium silicate and has a completely different chemical composition from a conventional phosphate magnesia cement composition where a weight ratio of $Mg_3(PO_4)_2 \cdot 8H_2O$ (bobierrite) and a phosphate is 100:120. Moreover, as a method of controlling a solidifying reaction, the addition of gypsum, a hydroxycarboxylic acid or a ketocarboxylic acid can enhance the strength. Examples of hydroxycarboxylic acids and ketocarboxylic acids capable of being applied in the present invention include citric acid, gluconic acid, ketogluconic acid and the like. In particular, citric acid is the most preferable. Taking citric acid as a representative example, an explanation is made below. On this occasion, these chemicals can be mixed as anhydride forms or various types of salts thereof.

Further, as a method to enhance the initial strength, calcium aluminate, alumina, aluminum silicate, ferrous sulfate, ferrous chloride and the like were added while an inorganic coagulant and a high polymeric coagulant were concurrently used in a high-water-content sludge or organic sludge whereupon the solidifying capability of the sludge was able to be highly improved compared with a conventional method.

That is, the present invention is a cement composition containing 100 parts by weight of magnesium oxide, 5 to 25% by weight of any one of silicic acid, alumina and iron oxide, 3 to 35 parts by weight of phosphate, 2 to 30 parts by weight of gypsum and 0.005 to 7 parts by weight of a hydroxycarboxylic acid or a ketocarboxylic acid are compounded.

DETAILED DESCRIPTION OF THE INVENTION

It has ordinarily been a prohibited matter to mix hydrated lime, caustic lime, burned dolomite, light burned magnesia or the like with a phosphate fertilizer or to concurrently apply them as fertilizers. The reason is that calcium phosphate or magnesium phosphate was generated, thereby causing solidification of the soil. Moreover, there has been no method to utilize this as cement. However, the present inventors have made an extensive study based on this theory and found a phosphate that can maintain a safe pH region by having the pH thereof lower than that of $Mg(OH)_2$ and with the help of a pH buffer action of phosphoric acid and, further, become a solidifying agent for light burned magnesia. Although the self-hardening capability of light burned magnesia has already been known, it has not been suitable for applications requiring high strength and it is sure that there has been a method to use it for oxychloride cement or phosphoric acid magnesia cement. However, it has a problem in water resistance, setting time and the like and, further, is high in cost so that it can enjoy only a limited market compared with Portland cement. Physical properties and cost which are not much different from those of Portland cement have been attained by a method which utilizes a phosphate fertilizer or phosphate as a phosphoric acid source thereby reducing an addition rate.

Light burned magnesium oxide, a phosphate fertilizer and a phosphate described in the present invention is soluble in citric acid and, since 0.005 part by weight to 7.0 parts by weight of citric acid are contained in the composition, a phenomenon can be seen such that the water solubility of light burned magnesium oxide, phosphate fertilizer and phosphate was increased, they are activated, the reactivity thereof are enhanced and the flow values thereof are increased. Hence, the setting time can be adjusted. For this reason, regardless of water-soluble phosphoric acid and water-insoluble phosphoric acid, a solidified reaction product can be obtained in which, since coexisting light burned magnesium oxide is soluble in citric acid, citric acid is critical in the present reaction as an essential ingredient. Further, gypsum as a component acts to adjust the hydration of the light burned magnesium oxide in the same way as in Portland cement whereupon anhydrous gypsum, hemihydrate gypsum, dihydrate gypsum and calcium sulfate are individually used according to their respective applications.

In a cement composition of the present invention, light burned magnesium oxide is suitable as the magnesium oxide to be used and it is preferable that a particle size of the light burned magnesium oxide is from 60 mesh to 360 mesh, a content of MgO in the composition is from 40% to 85% and a material purity of MgO is from 65% to 98% while the composition may contain an amount of from 5% to 25% of $SiO_2$, $Al_2O_3$ and/or $Fe_2O_3$ as an impurity.

As a means for further decreasing the pH, productivity and cost and improving the strength, there is a method in which a solid solution containing magnesium ferro aluminium solid solution by substituting for Ca used in a production method of Portland cement by Mg thereby producing magnesium silicate (mixed melting product of enstatite, forsterite and cordierite) or substituting for Ca in a production method of alumina cement by Mg thereby producing magnesium alminate (periclase, spinel) and further adding iron for a purpose of decreasing a melting point of the solid solution is produced and powders of the thus produced solid solution are acted on by a phosphate.

In a method to effectively utilize phosphates, a water-soluble phosphate fertilizer is used from among magnesium triple superphosphate, calcium triple superphosphate and calcium superphosphate, in this order of ease of application, and urea magnesium phosphate, magnesium ammonium phosphate, acidic magnesium phosphate and/or acidic calcium magnesium phosphate can be used in a quick-setting compound composition and, when quick setting is avoided, any of these components can be absorbed in an inorganic porous material such as diatomaceous earth and the like to allow it to be in a sustained release state or subjected to heating treatment at a temperature of 200° C. or over to allow it to form meta phosphoric acid. Examples of components which are soluble in citric acid include magnesium metaphosphate, calcium metaphosphate, fused phosphate, Thomas phosphate fertilizer and the like in this order of ease of solubility. An addition rate of phosphate in a composition is from 3 parts by weight to 35 parts by weight and is substantially determined by the content of $P_2O_5$ whereupon the addition rate is determined depending on the solubility thereof in water or citric acid and, when fineness of the phosphate exceeds a range of 200 mesh to 500 mesh, the reactivity thereof does not deteriorate, even if the addition rate of citric acid is held at a required minimum and, therefore, the addition rate of citric acid can be from 0.005 part by weight to 7 parts by weight. The above-described phosphates can be used individually or in a combination of two or more of them and also in various types of compositions according to the application.

Next, as gypsum to be used in the present invention, anhydrous gypsum, hemihydrate gypsum, dihydrate gypsum and calcium sulfate are selectively used in accordance with applications whereupon anhydrous gypsum is used for sludge treatment, hemihydrate gypsum for applications which require quick setting and dihydrate gypsum for applications which put stress on retardant setting.

A method can be performed in which a clinker of a solid solution is first produced by $3 MgO.SiO_2$, $3 MgO.Al_2O_3$ and $MgO.Al_2O_3$ or $NaO.2MgO.SiO_2.3MgO.Al_2O_3.Fe_2O_3$ which can form a solid solution as chemical ingredients in the cement composition according to the present invention and then a crushed product thereof is added to the above-described phosphate, gypsum and citric acid. Magnesite and brucite, magnesium oxide, magnesium dross or magnesium chloride as main materials of MgO sources, $MgO.SiO_2.Al_2O_3$ as an auxiliary material, magnesium vermiculite, forsterite, enstatite, chlorite, pyrope, talc, serpentinite, sepiolite, anthophyllite, spinel and the like as mineral ores, feldspar, clay and, further, iron oxide, iron chloride, ferrous sulfate, slag, iron ore and the like as iron sources containing no chromium and, furthermore, Ca or Mn of 5% or less may be included. Components are compounded so that respective coefficients inclusive of ratios of cement hydraulic properties show as follows in terms of that the CaO in a Portland cement type is substituted by MgO, hydraulic ratio is from 1.26 to 2.0, magnesium ratio is 2.5, chemical index is 1.0 or less, silicic acid ratio is from 2.0 to 3.0, activity coefficient is from 3.0 to 4.0, ratio of iron oxide to alumina is from 1.5 to 2.0, magnesium index is 1.09, cement index is 5.0, acidity coefficient is 7.5 and each of the saturation degree of magnesium, Hess number and Spinel number is 100. A simplest fused composition is made such that 130 parts by weight of magnesite, 30 parts by weight of clay and silica stone and 8 parts by weight of slag are mixed, melted at 1500, then cooled and crushed to be 300-mesh or more powders, the resultant powders are mixed with 4 to 5 parts by weight of gypsum, 3 to 35 parts by weight of the above-described phosphate and 0.005 to 7 parts by weight of citric acid thereby producing cement. In the thus produced clinker composition, an appropriate quantity of magnesite is replaced by serpentinite, $SiO_2$ contained in clay and silica stone is supplemented by serpentinite, clay and bauxite are used as $Al_2O_3$ sources and slag is used after being subjected to iron containing no chromium or phosphoric acid treatment. In the thus obtained solid solution chemical composition, the ratio of MgO is required to be large in order to generate a large quantity of $3MgO.SiO_2$, $3MgO.Al_2O_3$ and $2MgO.Fe_2O_3$ and it is preferable that the quantity of Na is increased to about 1% in order to enhance the hydraulic property.

In a magnesium aluminate type, $3MgO.Al_2O_3$ is contained as a main ingredient and $2MgO.Al_2O_3$ (periclase) and $3MgO.Al_2O_3.Fe_2O_3$ may be contained. However, a eutectic material of $3MgO.Al_2O_3$ and $12MgO.7Al_2O_3$ is preferable and it decreases a melting point thereby facilitating a production as in the aluminate cement to contain silic acid or iron oxide of from 3% to 10%. Since fire retardancy is not taken into consideration for the application of the present invention, it is preferable that the mole ratio of MgO in a mole ratio relationship of $MgO>Al_2O_3$ is an excessive one in order to enhance hydraulic capability. However, when the low temperature fusion capability is taken into consideration, if an iron content is increased while containing $MgO.Al_2O_3$ as a main ingredient, then it facilitates production. In ores as starting materials, magnesium oxide, magnesium dross, magnesium chloride and magnesium hydroxide are used as main magnesium sources, bauxite, aluminum dross and aluminum hydroxide are used as aluminum sources and, on this occasion, serpentinite can be utilized for the purpose of cost reduction. A production method comprises the steps of crushing the starting materials into powders of 80 mesh or less; making them into a briquet by adding 40% or less of water and subjecting the thus obtained briquet to a heating fusion treatment at a temperature between 1200° C. and 1700° C. for 6 hours to obtain a clinker. The thus obtained clinker is used after being crushed into powders of 500 mesh or less. Optionally, the clinker can also be used by mixing the composition as set forth previously. Phosphate which is a reactive solidifying agent has a low reactivity different from light burned magnesia so that because of the low alkalinity thereof, it is difficult to use in the form of pyrophosphoric acid but acid phosphate or phosphoric acid adsorbed in an inorganic porous material can be used. 3 to 35 parts, favorably 5 to 15 parts by weight of the above-described phosphate is added to 100 parts by weight of $MgO.Al_2O_3$ and then 3 parts by weight of gypsum and from 0.05 to 5 parts by weight of citric acid are added to produce a cement composition.

A soil stabilizer according to the present invention can shorten a setting time thereof by adding 0.5 to 20 parts by weight of calcium aluminate as a setting accelerator and can be used in a condition that the pH is not largely increased. Calcium aluminate as a component thereof may be a solid solution comprising $Ca_{12}Al_7$, $Ca_4Al_7$, $Ca_2Al$, CaAl and gypsum. By adding these materials, the soil stabilizer can set much quicker than that in which nothing is added to achieve early setting and early strength close to those of Portland cement of the ultra high-early strength type.

The soil stabilizer according to the present invention cannot only shorten the setting time but also enhance the water-absorbing property of the high water-content sludge by adding alumina, in particular activated alumina, burned bauxite, aluminum hydroxide and the like containing alumina. An addition rate is 3 to 30 parts by weight and favorably 5 to 10 parts by weight.

The cement composition according to the present invention can enhance the solidifying property thereof by adding kaolin, acid clay, clay, allophane, hydrated halloysite or montmorillonite as an aluminum silicate compound thereby increasing the viscosity thereof; hence it can have a plasticity and texture which cannot be achieved by Portland cement. When a porcelain-like texture can be obtained by adding 10 to 30 parts by weight of these materials, 10 to 30 parts by weight thereof is used and, when underwater non-separable property is required, 3 to 10 parts by weight thereof is a preferable range.

In a method in which the soil stabilizer according to the present invention is used together with an inorganic or high polymeric coagulant, an ordinary lime or cement type inorganic material cannot obtain a favorable flock and serves mainly as a pH adjusting agent, whereas the soil stabilizer according to the present invention is different from a calcium-based one and forms a favorable flock in a low alkaline region due to the pH buffer action by the contained phosphoric acid and the thus formed flock undergoes an underwater shift reaction to exhibit a phenomenon that it dries in the air by discharging water thereby easily obtaining a dehydrated cake of an organic sludge which cannot conventionally be obtained. When this reaction is utilized, it is possible that the dehydrated cake of the organic sludge having a water content of about 80% is changed into that having a water content of about 60% which can easily be treated. This phenomenon utilizes a phenomenon in which the soil stabilizer having crystallization water of 22 to 32 hydrated salts according to the present invention is changed into that of 8 hydrated salts and there is a convenient condition such that the phenomenon occurs in an acidic region or weakly alkaline region of about pH 8 and does not occur in a range of a high content thereof in a high strength region by virtue of a low range of addition rate of the soil stabilizer according to the present invention. As an inorganic coagulant, ferrous sulfate, ferrous chloride, poly aluminum chloride or the like is exemplified. An addition rate thereof is 0.5 to 5.0% of the total weight of sludge. As a high polymeric coagulant, polyacrylamide, a copolymer of polymethacrylic acid and polyacrylamide, a copolymer of maleic acid and polybutadience or the like is exemplified. These materials are used at an addition rate of 0.001 to 0.5%.

The cement composition according to the present invention can also be used as mortar as in the case of Portland cement whereupon it has characteristics that, since it does not exhibit whitening, when a pigment is added, it can be brightly colored and when an aggregate is added in a high compounding ratio, it can exhibit a good glossy color thereof and, moreover, since it has a white tint color, it has a tone of color which cannot be obtained by a conventional white cement. Tests conducted under conditions as set forth in JIS R-5201 show that the initial set is 2.5 hours at 20° C. when citric acid is added by 0.3%, final set is 3.3 hours, the flow value is as small as 11.5, but it does not increase linearly like that in Portland cement, bending and compression strength after 28 days are 3.2 N/mm² and 24.6 N/mm², respectively. Cement of this soil stabilizer is capable of producing various types of compounds having a pH of 10 or less by mixing with various kinds of aggregates or fillers whereupon it can prepare plastering materials, spray coating materials and various types of molds and, further, due to the low pH thereof, prepare GRC molds and mortar having glass-based aggregates using E glass fillers.

Concrete comprising the soil stabilizer according to the present invention is capable of producing a concrete in which a conventional concrete composition is held, except for cement replacement, and the thus produced concrete elutes substantially no hexavalent chromium and can find an animate object attached thereon in about 3 months due to its pH of 9.8 or less. Slump thereof in accordance with Concrete Standard Specification is low as being similar to that of mortar when a water reducing agent is not added, but the same flowability is obtained when about 0.3 of super water reducing agent is added, the bending strength and compression strength of that in a case of 300 kg/m³ with a water content showing 0 slump are 3.4 N/mm² and 26.8 N/mm², respectively. Contraction, creep and the like thereof are approximate to those of Portland cement and, characteristically, a surface thereof does whiten and hardly undergoes carbonation. But it is liable to permit iron formwork or iron bars to get rusted thereby necessitating anti-rust treatment on them.

Soil cement of the soil stabilizer according to the present invention has an advantage such that it can obtain a same strength with soil of a loamy layer, for example, loamy soil of the Kanto district and the like as that of an ordinary high sulfate type soil stabilizer or slag soil cement by one third of an addition rate of the latter two to thereby obtain 3.5 N/mm² in a case of 10 kg/m³. It also can advantageously solidify peat, andosols, quasi-gley soil, decomposed granitic soil, volcanic ashes, volcanic glassy sand and the like. It can with the same strength solidify white clay, argil, kaoline and the like which exist in soil of deep layers by one half the addition rate in the case of loamy soil, for example, of the Kanto district and the like. The soil cement of the soil stabilizer according to the present invention from which the air content therein has greatly been reduced by a vacuum soil kneader or a press mold can attain a density of 2.2, a pencil hardness of 6H or more and a high strength such as a bending strength of 23.4 N/mm² and compression strength of 121.4 N/mm² and, further, since the tone of the color of the soil can be held as it is, it can produce a mold which will not spoil the scenery. For this reason, secondary products such as unburned brick, artificial stone, building materials, boards, soil concrete mold and the like can be obtained and, further, soil sand concrete compounded with sand irrespective of incorporation or non-incorporation of aggregates or coarse aggregates and the like can be produced and, still furthermore, in the field of agriculture engineering, permanent footpaths between rice fields, weed preventive footpaths, canal retaining walls, revetment blocks and the like can be produced from on-site soil. In the field of soil stabilizing construction methods, deep mixing can be performed with the soil stabilizer according to the present invention either in the form of powders or a slurry whereupon a press-in method of an earth pillar and a continuous wall both incorporated with on-site soil can be utilized and constructed, respectively.

Further, in a surface soil improvement method, surface soil is mixed with the soil stabilizer according to the present invention by a stabilizer, a backhoe and other appropriate tools and machineries and imparted with plasticity by means of a planar pressing method using a vibration roller or a table compactor while adjusting the water content thereof thereby performing soil solidification in an easy manner. The soil stabilizer according to the present invention added with a plasticizer can be utilized in a backfilling grout for a shield, various types of soil grouting agents while using on-site soil and, since it is inherently provided with a property capable of being used in a multiplicity of applications when incorporated in a flash setting or retardant setting composition comprising any one of or a mixture of a phosphate, a setting accelerator, setting retarder and the like and also it can be shaped into granules, it allows the construction on site of a drainage conduit, water-permeable pavement and a backfilling material. These resultant products cause environmental pollution to an extremely low extent and, moreover, when pulverized, can be returned to the soil whereupon it becomes a recyclable material which does not aggravate the environment.

The soil stabilizer according to the present invention can solidify various types of construction sludge, sewage sludge, sedimentation sludge in beds of rivers and lakes with a relatively small amount thereof at a pH value of 9.5 or less. Conventional soil stabilizers tend to increase the usage thereof in order to suppress a pH value so that there are many cases in which solidification cannot be performed with a decrease of the addition rate thereof whereupon there is a limitation to sea water and organic sludge. However, the soil stabilizer according to the present invention can solidify construction and sedimentation sludges in beds of rivers and lakes by the addition of as small as 3 to 10% and can treat sewage sludge, even highly hydrated sludge thereof having a water content of 700 to 200%, when used together with an inorganic or high polymeric coagulant. These kinds of sludges have ordinarily been pretreated with hydrated lime before they are treated with the inorganic or organic coagulant whereupon ammonia dissolved in water tends to be salted out. However, in order to solve this problem, the sludge is neutralized using light burned magnesium oxide or magnesium hydroxide, added with the coagulant to produce a flock and the resultant flock is mixed with the soil stabilizer according to the present invention by 5% to 30% and stirred to be solidified and then water which has been captured in the thus solidified flock as crystallization water can be discharged by an underwater shift reaction under a mild alkali to mild acidic condition. This reaction can be viewed in bobierrite as in a chemical reaction, $Mg_3(PO_4)_2.22H_2O \rightarrow Mg_3(PO_4)_2.8H_2O$. However, a non-chemical equivalent reaction, $10(Mg_3(PO_4)_2).22H_2O-32H_2O \rightarrow 10(Mg_3(PO_4)_2).8H_2O$, is executed by a more remarkable shift reaction. This dehydration reaction enables a dehydration ratio to reach 60% to 69% while an ordinary physical dehydration is limited to be 80% to 120% whereupon it is characteristic in that, even if the thus solidified sludge is returned to water, it will not be restored to an original sludge form.

The soil stabilizer according to the present invention can produce various types of products by changing the components in the compounds or additives in accordance with the applications and usages whereupon the principal material, MgO, can be changed into magnesite or an Mg-containing ore. Therefore, it has a mass-production capability and cost close to those of Portland cement. It has a far lower pH compared with a conventional low alkali cement, does not interfere with the durability of E glass and does not pollute the environment so that it finds a multiplicity of industrial applications.

EXAMPLES

The present invention is specifically explained in detail with reference to the embodiments illustrated below.

Example 1

85 parts by weight of sea water light burned magnesium oxide (available from Kyowa Chemical Industry Co., Ltd.), 10 parts by weight of triple super phosphate powders, 5 parts by weight of natural anhydrous gypsum Type-II and 0.5 part by weight of citric anhydride were well mixed to obtain a soil stabilizer. In accordance with a cement testing method stipulated in JIS R5201, 520 g of the thus obtained soil stabilizer, 1560 g of standard sand and 312 g of water were mixed by a Hobert mixer for 10 minutes and then a flow test was conducted on the resultant mixture to obtain a flow value of 10.5 to 11.5. In the same way, a setting test was conducted on the resultant mixture to obtain an initial set of 3 hours and 23 minutes and a final set of 4 hours and 18 minutes. Further, 10 g of the mixture was diluted with 100 cc of deionized water and subjected to a pH measurement to obtain a pH value of 9.86. The above-described resultant mixture, namely, mortar, was flowed into a formwork of 40 mm×40 mm×160 mm to allow it to be molded. The thus molded material showed a compression strength of 5.6 N/mm$^2$, 13.7 N/mm$^2$ and 23.9 N/mm$^2$ at material ages of 3 days, 7 days and 28 days, respectively. Stability tests showed no cracking observed in the molded materials.

Example 2

365 parts by weight of basic magnesium carbonate of reagent first grade, 25 parts by weight of kaoline, 7.5 parts by weight of silica sand, 8.0 parts by weight of iron oxide and 80 parts by weight of water were mixed to prepare a cake. The thus prepared cake was then heated at 1600° C. for 6 hours in an electric oven to obtain a clinker. A block of this clinker was cooled and crushed by a ball-mill to collect powders of 300 mesh or less by a filtering operation. 100 parts by weight of the thus collected powders, 4 parts by weight of dihydrate gypsum, 12 parts by weight of dried heavy calcined phosphate powders of 200 mesh or less and 0.6 part by weight of sodium gluconate were mixed by a Hobert mixer for 10 minutes to obtain a soil stabilizer. In accordance with a cement testing method stipulated in JIS R5201, 520 g of the thus obtained soil stabilizer, 1560 g of standard sand and 312 g of water were mixed by a Hobert mixer for 10 minutes and then a flow test was conducted on the resultant mixture to obtain a flow value of 14.5 to 15.5. In the same way, a setting test was conducted on the resultant mixture to obtain an initial set of 4 hours and 36 minutes and a final set of 5 hours and 32 minutes. Further, 10 g of the mixture was diluted with 100 cc of deionized water and subjected to a pH measurement to obtain a pH value of 8.5. The above-described resultant mixture, namely, mortar, was flowed into a formwork of 40 mm×40 mm×160 mm to allow it to be molded. The thus molded material showed a compression strength of 6.4 N/mm$^2$, 15.3 N/mm$^2$ and 26.4 N/mm$^2$ at material ages of 3 days, 7 days and 28 days, respectively. Stability tests showed no cracking observed in the molded materials.

Example 3

182 parts by weight of basic magnesium carbonate of reagent first grade, 80 parts by weight of powdered serpentinite, 25 parts by weight of kaoline, 8.0 parts by weight of iron oxide and 60 parts by weight of water were mixed to prepare a cake. The thus prepared cake was then heated at 1600° C. for 6 hours in an electric oven to obtain a clinker. A block of this clinker was cooled and crushed by a ball-mill to collect powders of 300 mesh or less by a filtering operation. 100 parts by weight of the thus collected powders, 4 parts by weight of dihydrate gypsum, 12 parts by weight of dried heavy calcined phosphate powders of 200 mesh or less and 0.3 part by weight of sodium 2-ketoglutarate ware mixed by a Hobert mixer for 10 minutes to obtain a soil stabilizer. In accordance with a cement testing method stipulated in JIS R5201, 520 g of the thus obtained soil stabilizer, 1560 g of standard sand and 312 g of water were mixed by a Hobert mixer for 10 minutes and then a flow test was conducted on the resultant mixture to obtain a flow value of 14.5 to 15.5. In the same way, a setting test was conducted on the resultant mixture to obtain an initial set of 4 hours and 56 minutes and a final set of 5 hours and 42 minutes. Further, 10 g of the mixture was diluted with 100 cc of deionized water and subjected to a pH measurement to obtain a pH value of 8.4. The above-described resultant mixture, namely, mortar, was flowed into a formwork of 40 mm×40 mm×160 mm to allow it to be molded. The thus molded material showed a compression strength of 5.4 N/mm$^2$, 13.6 N/mm$^2$ and 23.8 N/mm$^2$ at material ages of 3 days, 7 days and 28 days, respectively. Stability tests showed no cracking observed in the molded materials.

Example 4

400 parts by weight of sea water light burned magnesium oxide (available from Kyowa Chemical Industry Co., Ltd.), 1000 parts by weight of alumina of reagent first grade, 17 parts by weight of ferric oxide and 35 parts by weight of water were kneaded to obtain a block having a 10φ which was then placed in a platinum skull crucible furnace and calcined at 1400° C. for 6 hours. The thus calcined block was cooled and crushed by a ball-mill to powders of 200 mesh or less. 100 parts by weight of the thus prepared powders, 15 parts by weight of super phosphate, 3 parts by weight of dihydrate gypsum and 0.5 part by weight of citric anhydride were mixed to obtain a soil stabilizer. In accordance with a cement testing method stipulated in JIS R5201, 520 g of the thus obtained soil stabilizer, 1560 g of standard sand and 312 g of water were mixed by a Hobert mixer for 10 minutes and then a flow test was conducted on the resultant mixture to obtain a flow value of 18.5 to 19.5. In the same way, a setting test was conducted on the resultant mixture to obtain an initial set of 2 hours and 56 minutes and a final set of 3 hours and 32 minutes. Further, 10 g of the mixture was diluted with 100 cc of deionized water and subjected to a pH measurement to obtain a pH value of 9.4. The above-described resultant mixture, namely, mortar, was flowed into a formwork of 40 mm×40 mm×160 mm to allow it to be molded. The thus molded material showed a compression strength of 15.3 N/mm$^2$, 23.7 N/mm$^2$ and 34.2

N/mm² at material ages of 3 days, 7 days and 28 days, respectively. Stability tests showed no cracking observed in the molded materials.

Example 5

100 parts by weight of aluminum dross (metallic aluminum 47%, alumina 43%, other components such as aluminum nitride, zinc and the like 9%), 140 parts by weight of magnesium dross (metallic magnesium 51%, MgO 45%, other components such as Mn, copper, zinc and the like 4%), 10 parts by weight of powdered serpentinite and 10 parts by weight of water were mixed to react. After 24 hours, the thus reacted mixture was molded into a briquet. The briquet was fused at 1750° C. in an electric oven, quenched and crushed by a ball-mill to powders of 400 mesh to obtain magnesium aluminate powders having a periclase composition. 100 parts by weight of the thus obtained powders, 5 parts by weight of magnesium metaphosphate powders, 3 parts by weight of citric acid and 65 parts by weight of water were mixed by a Hobert mixer for 10 minutes and then a flow test was conducted on the resultant mixture to obtain a flow value of 19.0 to 20.5. In the same way, a setting test was conducted on the resultant mixture to obtain an initial set of 4 hours and 20 minutes and a final set of 4 hours and 38 minutes. Further, 10 g of the mixture was diluted with 100 cc of deionized water and subjected to a pH measurement to obtain a pH value of 8.5. The above-described resultant mixture, namely, mortar, was flowed into a formwork of 40 mm×40 mm×160 mm to allow it to be molded. The thus molded material showed a compression strength of 14.2 N/mm², 24.2 N/mm² and 28.9 N/mm² at material ages of 3 days, 7 days and 28 days, respectively. Stability tests showed no cracking observed in the molded materials.

Example 6

85 parts by weight of light burned magnesium oxide (produced in Liaoning Province, P.R.C.) (200 mesh or less), 10 parts by weight of heavy calcined phosphate powders, 5 parts by weight of hemihydrate gypsum and 0.5 part by weight of citric anhydride were well mixed to obtain a soil stabilizer. In accordance with a cement testing method stipulated in JIS R5201, 520 g of the thus obtained soil stabilizer, 1560 g of standard sand and 312 g of water were mixed by a Hobert mixer for 10 minutes and then a flow test was conducted on the resultant mixture to obtain a flow value of 11.0 to 11.5. In the same way, a setting test was conducted on the resultant mixture to obtain an initial set of 3 hours and 28 minutes and a final set of 4 hours and 30 minutes. Further, 10 g of the mixture was diluted with 100 cc of deionized water and subjected to a pH measurement to obtain a pH value of 9.98. The above-described resultant mixture, namely, mortar, was flowed into a formwork of 40 mm×40 mm×160 mm to allow it to be molded. The thus molded material showed a compression strength of 4.3 N/mm², 14.2 N/mm² and 20.2 N/mm² at material ages of 3 days, 7 days and 28 days, respectively. Stability tests showed no cracking observed in the molded materials.

Example 7

85 parts by weight of light burned magnesium oxide (produced in Liaoning Province, P.R.C.) (200 mesh or less), 25 parts by weight of fused phosphate powders, 5 parts by weight of hemihydrate gypsum and 5 parts by weight of citric anhydride were well mixed to obtain a soil stabilizer. In accordance with a cement testing method stipulated in JIS R5201, 520 g of the thus obtained soil stabilizer, 1560 g of standard sand and 312 g of water were mixed by a Hobert mixer for 10 minutes and then a flow test was conducted on the resultant mixture to obtain a flow value of 12.0 to 12.3. In the same way, a setting test was conducted on the resultant mixture to obtain an initial set of 23 hours and 30 minutes and a final set of 32 hours and 56 minutes. Further, 10 g of the mixture was diluted with 100 cc of deionized water and subjected to a pH measurement to obtain a pH value of 10.96. The above-described resultant mixture, namely, mortar, was flowed into a formwork of 40 mm×40 mm×160 mm to allow it to be molded. The thus molded material showed a compression strength of 1.2 N/mm², 4.6 N/mm², 10.2 N/mm² and 21.5 N/mm² at material ages of 3 days, 7 days, 28 days and 35 days, respectively. Stability tests showed no cracking observed in the molded materials.

Example 8

85 parts by weight of light burned magnesium oxide (produced in Liaoning Province, P.R.C.) (200 mesh or less), 20 parts by weight of fused phosphate powders, 5 parts by weight of hemihydrate gypsum and 7 parts by weight of citric anhydride were well mixed to obtain a soil stabilizer. In accordance with a cement testing method stipulated in JIS R5201, 520 g of the thus obtained soil stabilizer, 1560 g of standard sand and 312 g of water were mixed by a Hobert mixer for 10 minutes and then a flow test was conducted on the resultant mixture to obtain a flow value of 12.0 to 13.7. In the same way, a setting test was conducted on the resultant mixture to obtain an initial set of 96 hours and 30 minutes and a final set of 131 hours and 15 minutes. Further, 10 g of the mixture was diluted with 100 cc of deionized water and subjected to a pH measurement to obtain a pH value of 10.98. The above-described resultant mixture, namely, mortar, was flowed into a formwork of 40 mm×40 mm×160 mm to allow it to be molded. The thus molded material showed a compression strength of 0, 0.6 N/mm², 80.8 N/mm² and 20.5 N/mm² at material ages of 3 days, 7 days, 28 days and 35 days, respectively. Stability tests showed no cracking observed in the molded materials.

Example 9

85 parts by weight of light burned magnesium oxide (produced in Liaoning Province, P.R.C.) (200 mesh or less), 5 parts by weight of magnesium metaphosphate powders, 5 parts by weight of anhydrous gypsum and 0.01 part by weight of citric anhydride were well mixed to obtain a soil stabilizer. In accordance with a cement testing method stipulated in JIS R5201, 520 g of the thus obtained soil stabilizer, 1560 g of standard sand and 312 g of water were mixed by a Hobert mixer for 10 minutes and then a flow test was conducted on the resultant mixture to obtain a flow value of 14.0 to 15.7. In the same way, a setting test was conducted on the resultant mixture to obtain an initial set of 4 hours and 25 minutes and a final set of 4 hours and 57 minutes. Further, 10 g of the mixture was diluted with 100 cc of deionized water and subjected to a pH measurement to obtain a pH value of 9.8. The above-described resultant mixture, namely, mortar, was flowed into a formwork of 40 mm×40 mm×160 mm to allow it to be molded. The thus molded material showed a compression strength of 7.6 N/mm², 14.3 N/mm² and 26.4 N/mm² at material ages of 3 days, 7 days and 28 days, respectively. Stability tests showed no cracking observed in the molded materials.

Example 10

300 kg/m³ of the soil stabilizer according to Example 1, 900 kg/m³ of river sand, 1450 kg/m³ of gravel, 210 kg/m³ of water and 6 kg/m³ of Mighty 21 were mixed and kneaded by a concrete mixer to obtain concrete having a slump of 58 and air volume of 5%. This concrete was flowed into a formwork of 100φ×200 mm and cured at 60% RH and 20° C. The unconfined compressive strength of the resultant product was 9.8 N/mm² and 24.3 N/mm² at material ages of 7 days and 28 days, respectively. Concrete having the above-described composition was added with 50 kg/mm³ of calcined kaoline and, further, allowed to have 220 kg/mm³ of water and 7 kg/mm³ of Mighty 21, thereby obtaining concrete having a slump of 52 and air volume of 4.6%. The unconfined compressive strength of the thus obtained concrete was 13.4 N/mm² and 26.7 N/mm² at material ages of 7 days and 28 days, respectively. This concrete exhibited a favorable abrasive resistant and smooth surface.

Example 11

300 kg/m³ of the soil stabilizer according to Example 2, 900 kg/m³ of river sand, 1450 kg/m³ of gravel, 210 kg/m³ of water and 9 kg/m³ of Mighty 150 were mixed and kneaded by a concrete mixer to obtain concrete having a slump of 53 and air volume of 5%. This concrete was flowed into a formwork of 100φ×200 mm and cured at 60% RH and 20° C. The unconfined compressive strength of the resultant product was 19.8 N/mm² and 27.5 N/mm² at material ages of 7 days and 28 days, respectively.

Example 12

85 parts by weight of light burned magnesium oxide (produced in Liaoning Province, P.R.C.) (200 mesh or less), 12 parts by weight of heavy calcined phosphate powders, 5 parts by weight of hemihydrate gypsum and 1 part by weight of citric anhydride were well mixed to obtain a soil stabilizer. 30 parts by weight of the thus obtained soil stabilizer, 30 parts by weight of silica sand No. 5, 70 parts by weight of loamy soil of the Kanto district and 65 parts by weight of water were mixed by a Hobert mixer for 20 minutes and then pushed into a formwork of 50φ×100 mm using a rammer to produce a mold. The mold showed an initial set of 2 hours and 30 minutes and a final set of 3 hours and 15 minutes. Further, 10 g of the resultant mixture was taken out of the formwork, diluted with 100 cc of deionized water and subjected to a pH measurement to obtain a pH value of 9.8. The mold showed a compression strength of 0.22 N/mm², 0.46 N/mm², 17.2 N/mm² and 21.7 N/mm² at material ages of 3 days, 7 days, 28 days and 35 days, respectively. It has a specific gravity of 2.1.

While, a mold made of 30 parts by weight of soil stabilizer having this composition, 30 parts by weight of silica sand No. 5, 70 parts by weight of loamy soil of the Kanto district, 3 parts by weight of Denka ES and 65 parts by weight of water showed an initial set of 34 minutes and a final set of 48 minutes. Further, 10 g of the resultant mixture was taken out of the formwork, diluted with 100 cc of deionized water and subjected to a pH measurement to obtain a pH value of 10.2. The mold showed a compression strength of 0.32 N/mm², 0.66 N/mm², 23.2 N/mm² and 26.5 N/mm² at material ages of 3 days, 7 days, 28 days and 35 days, respectively. It had a specific gravity of 2.1.

Example 13

85 parts by weight of light burned magnesium oxide (produced in Liaoning Province, P.R.C.) (200 mesh or less), 10 parts by weight of heavy calcined phosphate powders, 5 parts by weight of hemihydrate gypsum and 1 part by weight of citric anhydride were well mixed to obtain a soil stabilizer. 30 parts by weight of the thus obtained soil stabilizer, 30 parts by weight of silica sand No. 5, 70 parts by weight of loamy soil of the Kanto district and 60 parts by weight of water were mixed by a Hobert mixer for 20 minutes, pushed into a formwork of 50 φ×100 mm using a rammer and, further, applied with a pressure of 10 kg/cm² to produce a mold. The mold showed an initial set of 2 hours and 121 minutes and a final set of 2 hours and 38 minutes. Further, 10 g of the resultant mixture was taken out of the formwork, diluted with 100 cc of deionized water and subjected to a pH measurement to obtain a pH value of 9.6. The mold showed a compression strength of 3.2 N/mm², 5.68 N/mm² and 27.2 N/mm² at material ages of 3 days, 7 days and 28 days, respectively. It had a specific gravity of 2.3 and a pencil hardness of 6.

Example 14

80 parts by weight of light burned magnesium oxide (produced in Liaoning Province, P.R.C.) (200 mesh or less), 10 parts by weight of heavy calcined phosphate powders, 5 parts by weight of hemihydrate gypsum and 0.5 part by weight of citric anhydride were well mixed to obtain a soil stabilizer. 10 parts by weight of the thus obtained soil stabilizer, 90 parts by weight of acid clay and 65 parts by weight of water were mixed by a Hobert mixer for 20 minutes, pushed into a formwork of 50φ×100 mm using a rammer and, further, applied with a pressure of 10 kg/cm² to produce a mold. The mold showed an initial set of 3 hours and 20 minutes and a final set of 3 hours and 45 minutes. Further, 10 g of the resultant mixture was taken out of the formwork, diluted with 100 cc of deionized water and subjected to a pH measurement to obtain a pH value of 9.8. The mold showed a compression strength of 0.28 N/mm², 0.48 N/mm² and 12.2 N/mm² at material ages of 3 days, 7 days and 28 days, respectively. It had a specific gravity of 2.0 and a pencil hardness of 4.

Example 15

10 parts by weight of the soil stabilizer according to Example 2, 90 parts by weight of loamy soil of the Kanto district and 60 parts by weight of water were mixed by a Hobert mixer for 20 minutes, pushed into a formwork of 50φ×100 mm using a rammer and, further, applied with a pressure of 10 kg/mm² to obtain a mold. The mold showed an initial set of 4 hours and 26 minutes and a final set of 5 hours and 12 minutes. Further, 10 g of the resultant mixture was taken out of the formwork, was diluted in 100 cc of deionized water and subjected to a pH measurement to obtain a pH value of 8.4. The mold showed a compression strength of 0.14 N/mm², 0.26 N/mm² and 0.40 N/mm² at material ages of 3 days, 7 days and 28 days, respectively. It had a specific gravity of 1.74 and a pencil hardness of 2.

Example 16

10 parts by weight of the soil stabilizer according to Example 1 and 90 parts by weight of loamy soil of the Kanto district having a moisture content of 170% (specific gravity being 1.31) were mixed by a Hobert mixer for 10 minutes and pushed into a formwork of 50φ×100 mm using a rammer to obtain a mold. 10 g of the resultant mixture was taken out of the formwork, diluted in 100 cc of deionized water and subjected to a pH measurement to obtain a pH value of 9.8. The mold showed a compression strength of 0.25 N/mm$^2$ and 0.61 N/mm$^2$ at material ages of 7 days and 28 days, respectively.

Example 17

10 parts by weight of the soil stabilizer according to Example 1 and 90 parts by weight of loamy soil of the Kanto district having a moisture content of 105% (specific gravity being 1.41) were mixed by a Hobert mixer for 10 minutes and pushed into a formwork of 50φ×100 mm using a rammer to obtain a mold. 10 g of the resultant mixture was taken out of the formwork, diluted in 100 cc of deionized water and subjected to a pH measurement to obtain a pH value of 9.8. The mold showed a compression strength of 1.65 N/mm$^2$ and 2.08 N/mm$^2$ at material ages of 7 days and 28 days, respectively.

Example 18

10 parts by weight of the soil stabilizer according to Example 1 and 90 parts by weight of silt having a moisture content of 60% (specific gravity being 1.64) were mixed by a Hobert mixer for 10 minutes and pushed into a formwork of 50φ×100 mm using a rammer to obtain a mold. 10 g of the resultant mixture was taken out of the formwork, diluted in 100 cc of deionized water and subjected to a pH measurement to obtain a pH value of 9.9. The mold showed a compression strength of 0.26 N/mm$^2$ and 0.50 N/mm$^2$ at material ages of 7 days and 28 days, respectively.

Example 19

10 parts by weight of the soil stabilizer according to Example 1 and 90 parts by weight of decomposed granitic soil (moisture content of 180% and specific gravity of 1.34) were mixed by a Hobert mixer for 10 minutes and pushed into a formwork of 50φ×100 mm using a rammer to obtain a mold. 10 g of the resultant mixture was taken out of the formwork, diluted in 100 cc of deionized water and subjected to a pH measurement to obtain a pH value of 8.9. The mold showed a compression strength of 0.11 N/mm$^2$ and 0.340 N/mm$^2$ at material ages of 7 days and 28 days, respectively.

Example 20

15 parts by weight of the soil stabilizer according to Example 4 and 85 parts by weight of organic sludge having a moisture content of 400% (specific gravity being 1.12) were mixed by a Hobert mixer for 10 minutes and pushed into a formwork of 50φ×100 mm using a rammer to obtain a mold. 10 g of the resultant mixture was taken out of the formwork, diluted in 100 cc of deionized water and subjected to a pH measurement to obtain a pH value of 8.4. The mold showed a compression strength of 0.03 N/mm$^2$ and 0.08 N/mm$^2$ at material ages of 7 days and 28 days, respectively.

Example 21

30 parts by weight of the soil stabilizer according to Example 5, 70 parts by weight of loamy soil of the Knato district, 50 parts by weight of charcoal powders and 60 parts by weight of water were mixed by a Hobert mixer for 25 minutes to obtain soil having charcoal therein in the form of granules. 10 g of the thus obtained soil having charcoal granules was immersed in 100 cc of deionized water and subjected to a pH measurement to obtain a pH value of 9.3. The soil was filled in a formwork of 50φ×100 mm and then subjected to a compression test which showed a compression strength of 0.16 N/mm$^2$ and 0.36 N/mm$^2$ at material ages of 7 days and 28 days, respectively. It had a void volume ratio of 37%.

Example 22

30 parts by weight of the soil stabilizer according to Example 2, 70 parts by weight of volcanic ashes of Miyake Island and 50 parts by weight of water were mixed by a Hobert mixer for 10 minutes and pushed into a mortar bar formwork of 40 mm×40 mm×160 mm using a rammer to obtain a mold. 10 g of the resultant mixture was taken out of the formwork, diluted in 100 cc of deionized water and subjected to a pH measurement to obtain a pH value of 8.5. The mold showed a compression strength of 1.61 N/mm$^2$ and 25.6 N/mm$^2$ at material ages of 7 days and 28 days, respectively.

Example 23

Elution tests were conducted on the soil stabilizers according to Examples 1 to 6 to measure an elution quantity of hexavalent chromium. Results of the tests are shown in Table 1.

Total chromium quantity by:

DC method=diphenylcarbazide absorptiometry; and

IPC (T–Cr)=IPC, in accordance with environmental standards according to soil pollution stipulated in Environment Agency Notification No. 46.

TABLE 1

| | $Cr^{+6}$ elution quantities | |
|---|---|---|
| Soil stabilizers | DC method | IPC (T—Cr) |
| Example 1 | <0.02 | <0.02 |
| Example 2 | <0.02 | <0.02 |
| Example 3 | <0.02 | <0.02 |
| Example 4 | <0.02 | <0.02 |
| Example 5 | <0.02 | <0.02 |
| Example 6 | <0.02 | <0.02 |

Example 24

Elution tests were conducted on molds made of loamy soil of the Kanto district (moisture content of 60%) using 10 parts by weight of respective soil stabilizers according to Examples 1 to 6 in accordance with environmental standards according to soil pollution stipulated in Environment Agency Notification No. 46.

TABLE 2

| Material ages | | Cr$^{-6}$ elution quantities | | | |
| --- | --- | --- | --- | --- | --- |
| | | 14 days | | 28 days | |
| Soil stabilizers | addition rates | DC method | IPC (T-Cr) | DC method | IPC (T-Cr) |
| Example 1 | 10 | <0.02 | <0.02 | <0.02 | <0.02 |
| Example 2 | 10 | <0.02 | <0.02 | <0.02 | <0.02 |
| Example 3 | 10 | <0.02 | <0.02 | <0.02 | <0.02 |
| Example 4 | 10 | <0.02 | <0.02 | <0.02 | <0.02 |
| Example 5 | 10 | <0.02 | <0.02 | <0.02 | <0.02 |
| Example 6 | 10 | <0.02 | <0.02 | <0.02 | <0.02 |

These figures are detection limits of $Cr^{+6}$. The elution quantities and contents thereof are within the environmental standards.

Example 25

30 parts by weight of the soil stabilizer according to Example 3, 70 parts by weight of volcanic ashes of Miyake Island, 5 parts by weight of burned bauxite and 53 parts by weight of water were mixed by a Hobert mixer for 10 minutes and pushed into a mortar bar formwork of 40 mm×40 mm×160 mm using a rammer to obtain a mold. 10 g of the resultant mixture was taken out of the formwork, diluted in 100 cc of deionized water and subjected to a pH measurement to obtain a pH value of 8.5. The mold without addition of the burned bauxite showed an initial set of 3 hours and 45 minutes, while that added with the burned bauxite showed an initial set of 2 hours and 54 minutes. The mold showed a compression strength of 1.84 N/mm$^2$ and 26.2 N/mm$^2$ at material ages of 7 days and 28 days, respectively.

Example 26

0.001 g of Accofloc B-1 (copolymer of polyacrylic acid and polyacrylamide) was dissolved in water and then added into 1000 ml of organic sludge having a moisture content of 400% (specific gravity of 1.12). The thus prepared sludge having Accofloc was mixed with 150 parts by weight of the soil stabilizer by a Hobert mixer for ten minutes according to Example 4 and flowed into a formwork of 50φ×100 mm to obtain a mold. 10 g of the resultant mixture was taken out of the form work, diluted with 100 cc of deionized water and subjected to a pH measurement to obtain a pH value of 8.2. The mold showed a compression strength of 0.02 N/mm$^2$ and 0.11 N/mm$^2$ at material ages of 7 days and 28 days, respectively. When a solidified product of this mold was held in the air, it underwent dehydration whereupon the weight thereof was decreased from 286 g to 57.2 g in 14 days while, when it was immersed in water, it was in a sandy form and did not return to sludge.

Example 27

1000 ml of sewage activated sludge having a moisture content of 600% (specific gravity being 1.04) was neutralized by 8 g of MgO, added with an aqueous solution comprising 0.005 g of Accofloc A-3 (copolymer of polyacrylic acid and polyacrylamide), added with 50 parts by weight of the soil stabilizer according to Example 4 and well mixed. The resultant mixture was allowed to stand for 4 hours to form a flock. After a supernatant liquid of the mixture was removed therefrom, the mixture was subjected to a filtering operation by a filter press to obtain a dehydrated cake having a moisture content of 64%. If neutralization was performed by lime, ammonium gas was generated. However, when performed by MgO, no ammonium gas was generated whereupon the resultant dehydrated cake hardly smelled.

Example 28

1000 cc of sewage activated sludge having a moisture content of 600% (specific gravity of 1.04) was neutralized by 8 g of MgO, added with an aqueous solution comprising 4.5 g of aluminum sulfate, added with 150 parts by weight of the soil stabilizer according to Example 4 and well mixed. The resultant mixture was allowed to stand for 4 hours to form a flock. After a supernatant liquid of the mixture was removed therefrom, the mixture was subjected to a filtering operation by a filter press to obtain a dehydrated cake having a moisture content of 52%. Though the ammonium content in the sewage was enough to generate gas, there was no generation of ammonium gas during neutralization by MgO whereupon the resultant dehydrated cake hardly smelled.

The invention claimed is:

1. A cement composition comprising 100 parts by weight of magnesium oxide, 5 to 25% by weight of at least one of silicic acid, alumina and iron oxide, 3 to 35 parts by weight of a phosphate, 2 to 30 parts by weight of gypsum and 0.005 to 7 parts by weight of a hydroxycarboxylic acid or a ketocarboxylic acid.

2. The composition as claimed in claim 1, additionally comprising a crushed product of a magnesium silicate solid solution which is added to the phosphate, gypsum and hydroxycarboxylic or ketocarboxylic acid.

3. The composition as claimed in claim 1, additionally comprising a crushed product of a magnesium aluminate solution which is added to the phosphate, gypsum and hydroxycarboxylic or ketocarboxylic acid.

* * * * *